UNITED STATES PATENT OFFICE.

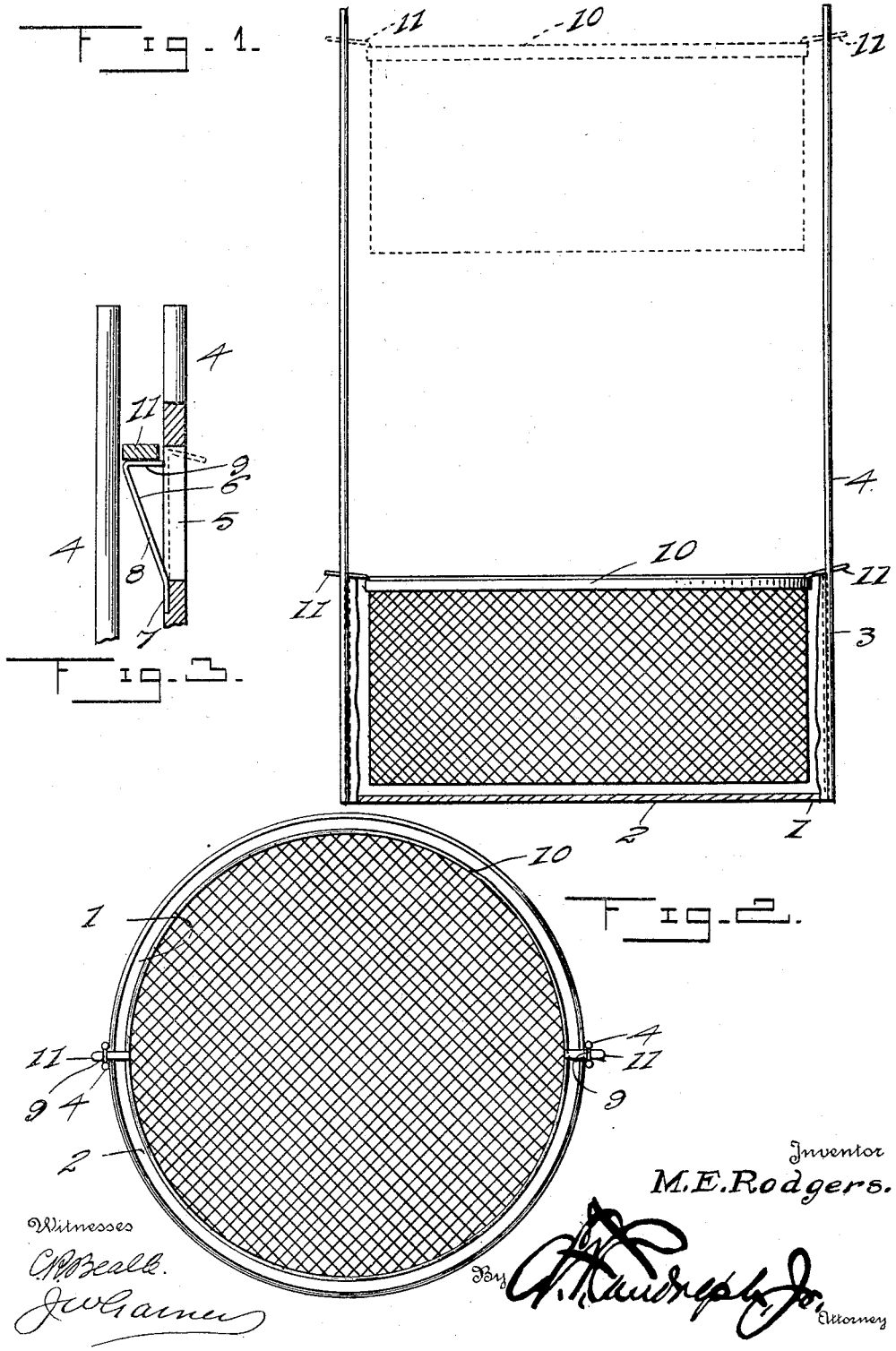

MARY E. RODGERS, OF CHICAGO, ILLINOIS.

FRYING UTENSIL.

1,205,026.  Specification of Letters Patent.  Patented Nov. 14, 1916.

Application filed September 28, 1915. Serial No. 53,062.

*To all whom it may concern:*

Be it known that I, MARY E. RODGERS, a citizen of the United States, residing at Chicago, in the county of Cook and State of Illinois, have invented certain new and useful Improvements in Frying Utensils; and I do hereby declare the following to be a full, clear, and exact description of the invention, such as will enable others skilled in the art to which it appertains to make and use the same.

This invention is an improved utensil for use in restaurants and other like places for frying Saratoga chips, French fried or shoe string potatoes, oysters, frog legs and other like food, the object of the invention being to provide an improved utensil of this kind embodying a vessel in which lard or other suitable fat is heated, a basket which is adapted to be submerged in and removed from the vessel and means to support the basket in elevated position when the latter is raised from the frying vessel and after the contents of the basket have been fried.

The invention consists in the construction, combination and arrangement of devices hereinafter described and claimed.

In the accompanying drawings:—Figure 1 is partly an elevation and partly a sectional view of a frying utensil constructed in accordance with my invention and showing the basket lowered. Fig. 2 is a plan of the same. Fig. 3 is a detail view, partly in section, and partly in elevation and showing the devices for supporting the basket when the latter is raised.

In the embodiment of my invention I provide a vessel 1 which is here shown as cylindrical in form and as comprising a bottom 2 and a cylindrical wall 3. This vessel, which is the frying vessel, may be made of porcelain, aluminum or any other suitable material and may be of any suitable size and shape, and is adapted to be used on a stove or furnace for heating a quantity of lard or other suitable fat and keeping the same in highly heated condition. On opposite sides of the vessel 1 are two pairs of vertical standard rods 4. The rods of each pair are spaced apart a suitable distance, as indicated in Figs. 2–3 and one rod of each pair is provided at a suitable distance from its upper end with an opening 5 and is also provided with a spring support 6 which is arranged on the side next the opposing rod and comprising a bent spring wire having a lower portion 7 secured to the rod at a point below the opening, an inclined portion 8 extending toward the next rod and a horizontal arm 9 at the upper end of said inclined portion and extending outwardly to the opening 5, said opening affording clearance for said support when the latter is bent back toward the rod to which it is attached.

I also provide a frying basket 10 which is made of mesh wire material as here shown and is somewhat smaller than the vessel 1 and hence adapted to be lowered thereinto together with potatoes or other articles of food to be fried, that have been placed in the basket. At opposite sides of the basket, at its upper side, are outstanding supporting arms 11 which operate in the vertical spaces between the rods 4. When the basket is raised to remove the articles from the hot grease its supporting arms 11 move upwardly between the wire standards 4 until they strike the inclined parts 8 of the supports 6, when owing to the upward movement of the basket the said arms 11 move the flexible spring wire supports outwardly until said arms get above said supports, whereupon the supports spring inwardly under the arms, as shown in Fig. 3 and serve to support the basket with its contents in elevated position, allowing its contents to be drained from the hot grease and to be taken out of the basket as desired.

In practice a cooking unit will in accordance with my invention comprise one vessel and two or more baskets. The use of two or more baskets permits the cooking of a basket of food while a basket of cooked food is supported on the rods for the purpose of draining grease from the food.

Having thus described my invention, I claim:—

A frying utensil comprising an imperforated lower receptacle, an upper perforated receptacle adapted to fit in said lower receptacle, a pair of vertical spaced standards secured to each side of said lower receptacle, one standard of each pair having a recess formed therein adjacent the upper end thereof, a leaf spring secured to said standards adjacent said recess, said springs having a right angular bent portion on its free end, a pair of lugs secured to said perforated receptacle on the opposite sides thereof, said lugs being adapted to slide between said vertical standards and engage the upper portion of said lower receptacle when the perforated receptacle is in its lowermost position and engage the angular bent portions of the springs when in its elevated position.

In testimony whereof I affix my signature in presence of two witnesses.

MARY E. RODGERS.

Witnesses:
W. H. SCHENDORF,
EDITH LINDAHL.

Copies of this patent may be obtained for five cents each, by addressing the "Commissioner of Patents, Washington, D. C."